UNITED STATES PATENT OFFICE.

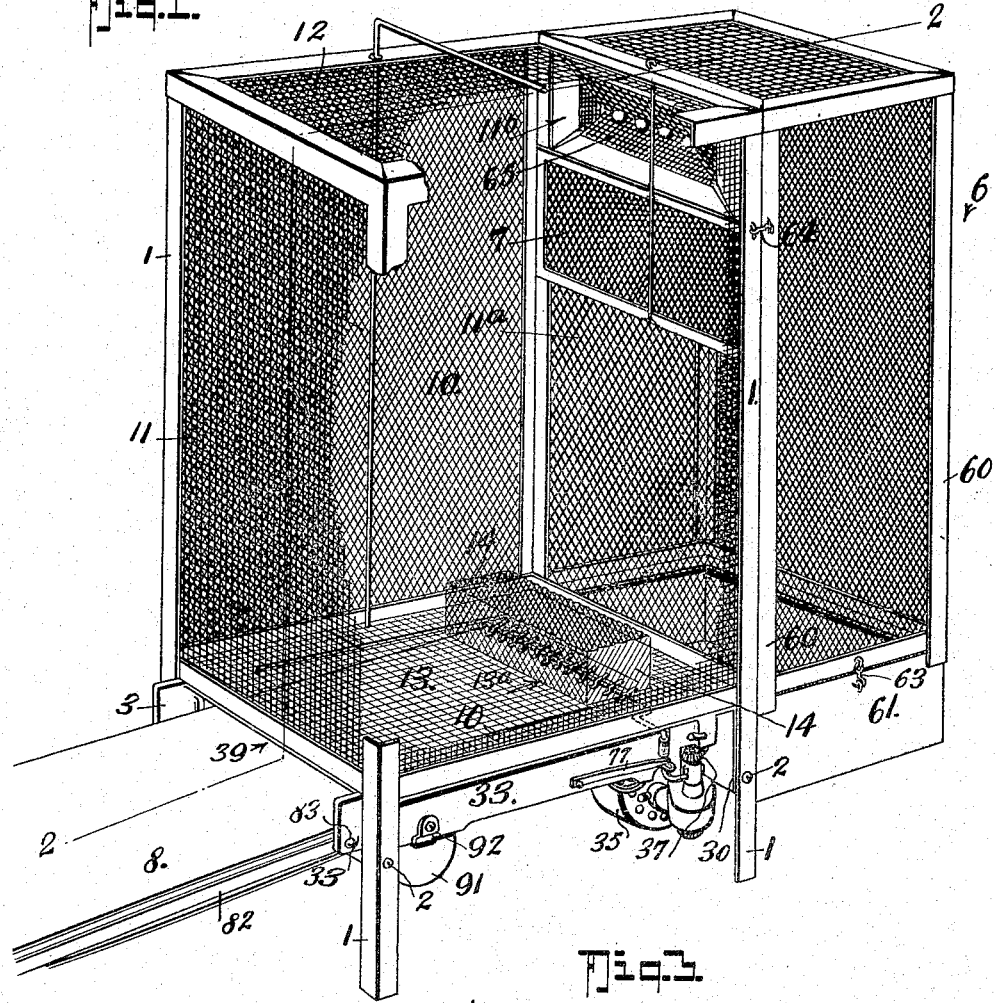
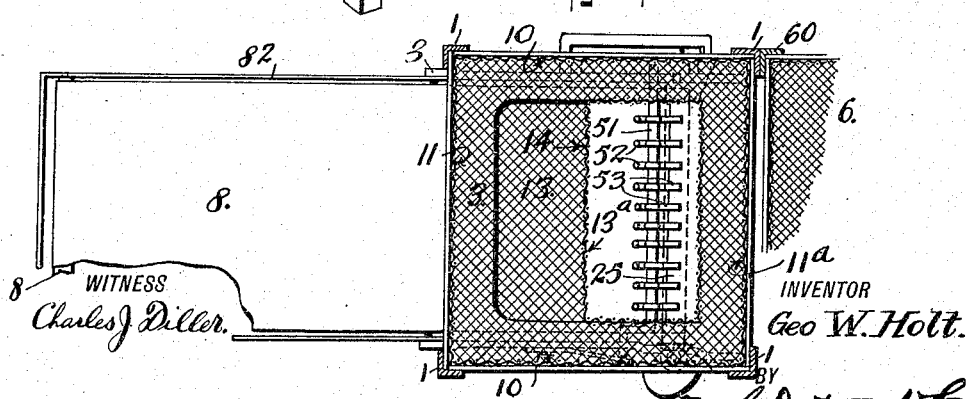

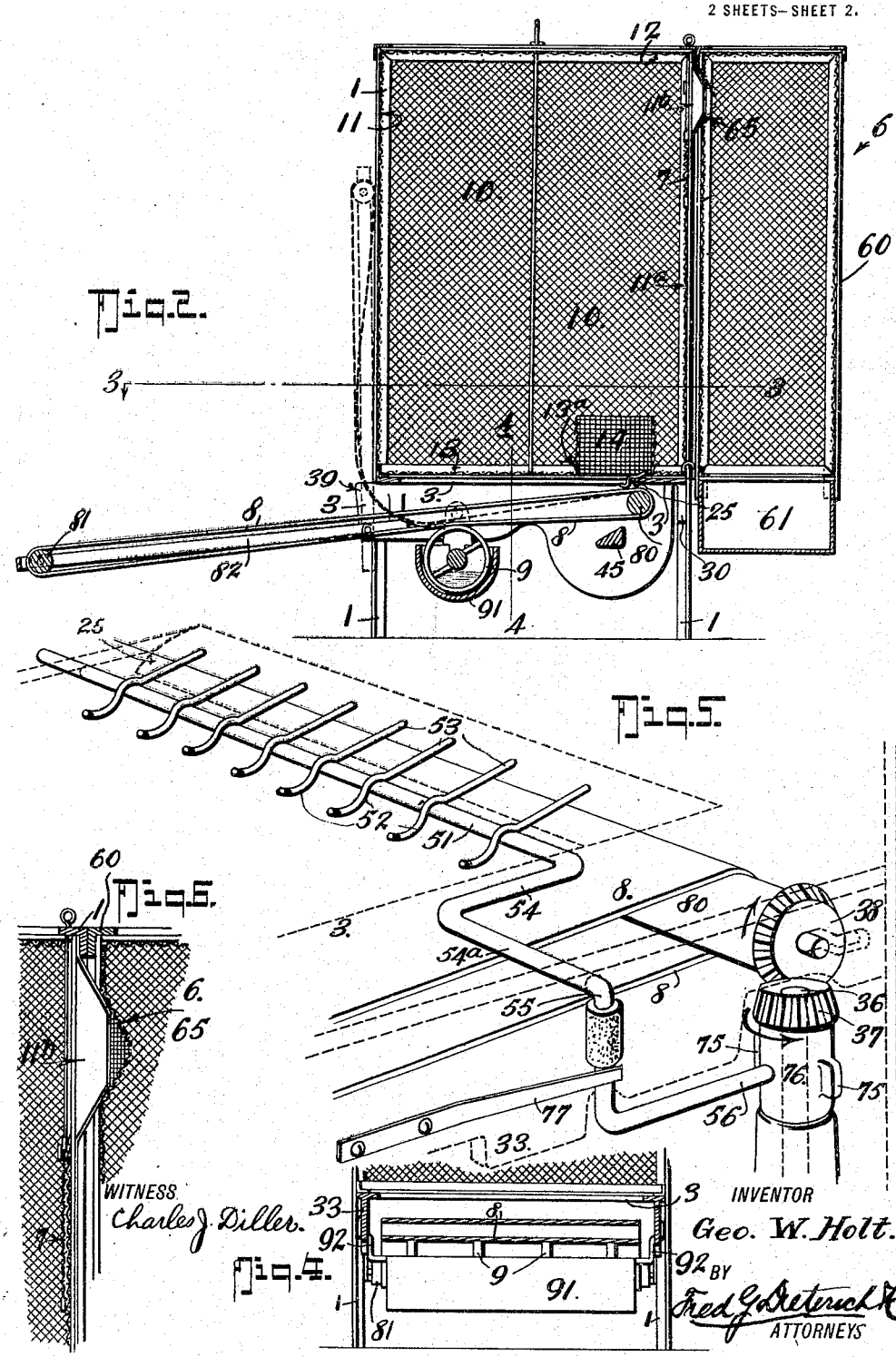

GEORGE WASHINGTON HOLT, OF POPLAR BLUFF, MISSOURI, ASSIGNOR TO JUDSON PRICE, OF POPLAR BLUFF, MISSOURI.

MECHANICAL FLY-CATCHER.

1,189,570. Specification of Letters Patent. Patented July 4, 1916.

Application filed September 17, 1915. Serial No. 51,249.

*To all whom it may concern:*

Be it known that I, GEORGE W. HOLT, residing at Poplar Bluff, in the county of Butler and State of Missouri, have invented certain new and useful Improvements in Mechanical Fly-Catchers, of which the following is a specification.

This invention is in the nature of an improved fly catcher in which is included an endless baited conveyer belt for carrying flies caught thereon to a trapping cage and primarily my invention has for its object to provide an improved fly catcher of the general character stated in which the coöperating parts are so designed that the trap can be readily built for ordinary domestic uses, or as a motor driven fly catcher, especially adapted for use in packing houses, and other places, where large quantities of the pests constantly congregate.

My invention also has for its object to provide a fly catcher in which the means for trapping the flies include supplemental fly gathering compartments detachably connected with the main trapping cage or chamber and an improved means for directing the flies as they leave the baited conveyer into the said main trapping cage.

My invention also embodies, in a fly catcher of the general character stated, an improved means, in the nature of an agitator or "kicker" device that coöperates with that end of the conveyer belt from which the caught flies pass up into the trapping cage, and which operates to positively cause the flies that tend to adhere to the baited belt, to separate from the belt in such manner that they will pass up into the trapping chamber and which tends to retard the flies from passing down back onto the belt at the delivery end thereof.

Furthermore, my invention seeks to provide a fly catching means of a simple but compact construction in which the parts are coöperatively so combined that such portion of the endless conveyer belt that is exposed for catching the flies, when not in use, may be readily folded up alongside of the trapping cage, and the other or delivery portion of the belt and its carrying frame extends under the trapping cage, in such manner that it forms, as it were, a solid unit, and bottom closure for the fly entrance to the trapping cage; an improved means being also provided which coöperates with the fly inlet to the trapping cage that tends to cause the flies to rapidly pass up in large quantities into the trapping cage also and prevent them from flying down back through the said fly entrance.

With other objects in view that will hereinafter appear, my invention embodies the peculiar and novel features of construction and combination of parts hereinafter referred to and specifically pointed out in the appended claims and illustrated in the accompanying drawing, in which:

Figure 1 is a perspective view of my improved fly catcher, the parts being in their operative position. Fig. 2 is a vertical section thereof taken substantially on the line 2—2 of Fig. 1, the hinged end of the endless conveyer frame and the corresponding portion of the endless conveyer belt being shown (in dotted lines) as swung up and held against the trap cage or frame. Fig. 3 is a horizontal section on the line 3—3 of Fig. 2. Fig. 4 is a transverse section on the line 4—4 of Fig. 2, and looking in the direction of the arrow. Fig. 5 is a detail perspective view of the "kicker" device operating mechanism. Fig. 6 is a detail section that shows the outlet from the main cage and the conical passage to the supplemental cage.

In the practical arrangement, my fly catching mechanism consists of a frame or body that constitutes the main fly holding cage or chamber and the said body includes four standards 1—1, preferably of heavy sheet metal, suitably angled for being readily secured, by screws 2, to the corner members 30 of a cast metal bottom frame 3, which supports the conveyer devices, a means for automatically baiting the conveyer, a motor device for operating the conveyer belt and a "kicker" device hereinafter specifically referred to.

The sides 10—10, ends 11—11ª, the top 12 and the bottom 13 of the main trapping cage, are of screen wire and the bottom screen 13, which lies flatwise over the cast metal bottom frame 3, has an elongated transverse opening 13ª that forms the fly entrance to the cage and the said opening, which does not extend entirely across the bottom, has marginal vertically extended studs and ends 14 that form a wide throatway or passage, the full length and width of the fly entrance, to provide for rapidly directing the flies as they leave the conveyer belt, into the main cage or trap, it being understood that the habit of the pests is to fly from the entrance to the top of the cage and since the marginal sides and ends 14 extend some distance above the bottom of the cage, such of the flies that cannot well rise to the top of the cage and drop back toward the bottom 13, are effectively held from flying over the marginal sides and ends 14 back through the said entrance opening.

The end 11ª of the cage has a large outlet 11ᵇ at the top which extends the full width thereof and the said outlet communicates with a supplemental fly trapping cage 6, the framing of which is also formed of heavy sheet metal angle members 60 and screen wire sides, ends and top. The supplemental cage or holder 6 also includes a solid sheet metal collecting trough 61 that forms the bottom of the cage 6 and is detachably connected to the said cage frame 6 by staples and hooks 63, as shown. The supplemental cage or holder 6, when at the operative position, is hung over the inner end of the main cage by staples and hooks 64, and the upper end of that side of the holder 6 that abuts the main cage is provided with horizontally disposed and inwardly projected conical fly passage 65 that extends entirely across the large fly outlet 11ᵇ of the main cage, as is clearly shown in Fig. 6.

7 designates a slidable gate on the main cage for closing the outlet 11ᵇ when the supplemental cage 6 is removed.

8 designates an endless conveyer belt of a suitable flexible material, which in practice is coated with any substance that attracts flies.

In the complete structure, my improved fly catcher includes means for automatically coating the endless catcher belt as the same is in motion with a suitable baiting substance. In the drawings, I have shown an automatic means, which is well adapted for use for coating the endless catcher belt and the said means, which *per se* forms no part of my invention, is preferably arranged as is shown in Fig. 2, by reference to which it will be seen disk rollers 9—9 of a suitable absorbent material are mounted in a trough-like holder 91, that extends transversely under and entirely across the conveyer belt. Trough 91, which holds the bait substance, includes brackets 92, pendently and removably supported on the opposite side portions 33 of the casting 3, and the said disk rollers 9—9 are held dipped in the bait solution and in direct contact with the belt 8, as shown.

The conveyer belt 8 passes over a roller 80 journaled in the side members of the metal frame 3 and located just under the inner edge of the fly entrance 13ª to the main cage and said belt also passes over a roller 81 that is removably held in the outer ends of a pair of side bars 82—82 pivotally mounted, at their inner ends, on the stud screws 83 on the frame sides 33, the said pivotal connection being such that the bars 82, with the corresponding end of the belt, can be readily swung up against the front side of the main holder or cage, as indicated in dotted lines on Fig. 2.

35 designates a motor which, for small size machines that are more especially adapted for ordinary domestic uses, may be a spring motor, and for the larger size of machines an electric motor, as shown, and the said motor, which in practice is detachably mounted on a cross bar 45 of the casting 3, includes a driven shaft 36 that carries the pinion 37 which meshes with and drives a gear 38 on the shaft of the inner belt roller 80.

As is clearly shown in Fig. 2, the side bars 82 of the conveyer belt frame are slightly inclined from the horizontal plane so as to provide an ample throatway or passage 39 to allow the flies caught on the belt to be freely carried up to the delivery end of the said belt, and at this point it should be stated, that at that edge of the fly entrance just over the roller 80 is located a downwardly curved member 25, preferably an integral portion of the casting 3 which extends entirely across the said edge and sufficiently close to the belt 8 that it acts as a retarder for arresting the further passage of the flies and as a scraper for clearing off such of the flies that may adhere to the belt 8, as it passes over the roller 80 and from passing along on the under side of the belt. For positively causing the live flies that have a tendency to adhere to the delivery end of the belt to leave the said belt as they pass to the retarding member 25, I have provided what I term a "kicker" device, the construction of which is shown in Figs. 3 and 5 and the same is in the nature of a rod 51 that extend entirely across the fly entrance and is located just in front of the retarding strip 25, a series of short fingers 52 that extend inwardly from the rod and long fingers 53 that extend rearwardly from such rod and project over the retarding member 25. The fingers 52—53 of each set are preferably the opposite ends of a stout wire that is made fast on the rod 51.

54 designates a crank-like rod member, one end of which is fixedly attached to the rod 51, and the other end 54ª thereof is extended, through an opening in one of the sides 33 of the frame 3, then bent vertically downward as at 55 and then at right angles to form a finger 56 for extending into the path of movement of one or more lateral cams 75 on a hub 76 that turns with the motor driven shaft 36. A spring 77 engages the number 55 of the rod 51 and tends to quickly push back the rod under a "kicking" action when the member is released from the cam or cams 75 on the hub 76.

By reason of providing a "kicker" device arranged as shown and described, a constant agitation takes place at the delivery end of the catcher when the said belt is in motion that tends to continuously keep the flies that may stick on said delivery end of the belt, in motion and thereby prevent an accumulation of flies partly or wholly alive at the retarder member 25, it being understood that the constant running of the belt creates motion at the said delivery end that aids in keeping the flies in action as they pass up from the belt into the said rectangular screen. Further, by reason of the peculiar construction and novel arrangement of the parts as shown and described, when the machine is set up for use, the flies that are caught on the belt are conveyed under the bottom of the chamber 1 to the large opening in the main cage bottom and since there is much light at the said opening, the flies rise up from the belt into the rectangular passage and up toward the top of the main cage and in their attempt to escape, they pass on through the large opening in the upper end of the said cage into the conical receiver that forms a part of the supplemental holder 6.

From the foregoing description taken in connection with the drawings it is thought the complete arrangement and the manner in which the catcher operates and the advantages of its construction will be readily understood.

The several parts, though adapted for use on a small scale for ordinary domestic purposes, are especially well adapted for making catchers of such capacity that are especially useful in packing houses and such communities where the pests are constant and in large numbers.

What I claim is:

1. A trap of the class described, including a cage having a bottom provided with a transversely extended relatively narrow opening, an endless conveyer under the said bottom parallel therewith, the said conveyer having its delivery end located directly under the opening in the bottom and means coöperating with the said end of the conveyer and the opening for concentrating the conveyed flies at the said opening to thereby cause them to pass up through the opening as they leave the conveyer.

2. A trap of the class described, including a cage having a bottom provided with a transversely extended relatively narrow opening, an endless conveyer under the said bottom parallel therewith, the said conveyer having its delivery end located directly under the opening in the bottom, means coöperating with the said end of the conveyer and the opening for concentrating the conveyed flies at the said opening to thereby cause them to pass up through the opening as they leave the conveyer, and a rectangular receiver centrally mounted on the said cage bottom and extended over the fly inlet in the said bottom.

3. In a trap of the character described, the combination with a main frame, a cage mounted on the said frame which includes a bottom having a fly entrance; of a fly catching means that conveys the caught flies to the said entrance in the bottom of the cage, the said means including an endless conveyer that extends entirely under the cage bottom and includes a frame portion fixedly held under the said bottom, a roller journaled in the fixedly held frame portion directly under the entrance to the cage, a frame portion hingedly connected to the main frame to fold vertically thereagainst, a roller journaled in the outer end of the hinged frame portion, an endless belt that passes over the rollers in the two portions of the conveyer frame and a motor geared up with the fixedly held roller.

4. The combination in a fly catcher of the character described, with the main frame, a cage mounted on the said frame and including a bottom having a restricted transverse opening adjacent the rear wall of the cage, an endless conveyer that passes under the said bottom, a fixedly held roller bearing for the conveyer belt located directly under the said opening, and a frame portion hingedly connected to the main frame, and a roller in the outer end of the hingedly mounted frame portion over which the belt passes, and a fixedly held means at the delivery end of the conveyer belt for directing the flies into the opening in the bottom of the cage.

5. In a fly trap, a cage or holder including a screen wire bottom having an elongated transverse fly passage in one end, a screen wire fence or wall that surrounds the sides and ends of the said opening and which extends up into the cage, an endless baited conveyer mounted under the bottom of the cage and having its outer end projected beyond the cage, means at the discharging end of the conveyer for directing the flies off the conveyer into the fly passage in the bottom of the cage and means mounted on the cage frame for imparting motion to the conveyer.

6. In a fly trap, a cage or holder including a screen wire bottom having an elongated transverse fly passage in one end, a screen wire fence or wall that surrounds the sides and ends of the said opening and which extends up into the cage, an endless baited conveyer mounted under the bottom of the cage and having its outer end projected beyond the cage, means at the discharging end of the conveyer for directing the flies off the conveyer into the fly passage in the bottom of the cage, means mounted on the cage frame for imparting motion to the conveyer, the said conveyer including a supporting frame formed of an inner section fixedly held under the cage bottom and an outer section hinged to the inner section to fold up against the outside of the cage frame.

7. In a fly trap, a cage or holder including a screen wire bottom having an elongated transverse passage, an endless conveyer mounted under the bottom of the cage and having its outer end projected beyond the cage and its inner edge projected to deliver beneath said bottom opening, means at the inner or discharging end of the conveyer for directing the flies off the conveyer into the bottom opening of the cage, said means including an agitator device mounted on the frame, and motor driven devices mounted on the cage frame for imparting motion to the conveyer and intermittently actuating said agitator device.

GEORGE WASHINGTON HOLT.

Copies of this patent may be obtained for five cents each, by addressing the "Commissioner of Patents Washington, D. C."